US009797509B2

(12) United States Patent
Ekonen et al.

(10) Patent No.: US 9,797,509 B2
(45) Date of Patent: Oct. 24, 2017

(54) TRANSFER CASE HAVING A SHIFT MECHANISM

(71) Applicant: ArvinMeritor Technology, LLC, Troy, MI (US)

(72) Inventors: Todd R. Ekonen, Howell, MI (US); Matthew Starna, New Baltimore, MI (US); Laura Klemm, Shelby Township, MI (US); Ed Eshelman, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 554 days.

(21) Appl. No.: 14/016,376

(22) Filed: Sep. 3, 2013

(65) Prior Publication Data

US 2015/0059508 A1    Mar. 5, 2015

(51) Int. Cl.
| | | |
|---|---|---|
| *B60K 17/344* | (2006.01) | |
| *F16H 63/08* | (2006.01) | |
| *F16H 63/18* | (2006.01) | |
| *F16H 63/38* | (2006.01) | |

(52) U.S. Cl.
CPC ........... *F16H 63/08* (2013.01); *B60K 17/344* (2013.01); *F16H 63/18* (2013.01); *F16H 63/38* (2013.01); *Y10T 74/20018* (2015.01)

(58) Field of Classification Search
CPC .......... F16H 63/08; F16H 63/38; F16H 63/18; F16H 2200/0017; F16H 2057/02052; F16H 16/206; B60K 17/344
See application file for complete search history.

(56) References Cited

U.S. PATENT DOCUMENTS

| | | | | |
|---|---|---|---|---|
| 4,377,951 A * | 3/1983 | Magg | ...................... | F16H 61/24 |
| | | | | 74/473.28 |
| 4,531,423 A * | 7/1985 | Fogelberg | ............... | F16H 63/18 |
| | | | | 180/247 |
| 4,704,917 A * | 11/1987 | Hiroyasu | ............. | B60K 17/344 |
| | | | | 180/247 |
| 4,770,280 A * | 9/1988 | Frost | .................... | B60K 17/344 |
| | | | | 180/247 |
| 4,785,681 A | 11/1988 | Kuratsu et al. | | |
| 5,713,243 A * | 2/1998 | Williams | ............... | B60K 23/08 |
| | | | | 74/337.5 |
| 6,450,057 B1* | 9/2002 | Winkler | .................. | F16H 63/30 |
| | | | | 74/473.1 |
| 7,240,577 B2* | 7/2007 | Choi | ....................... | F16H 63/18 |
| | | | | 74/335 |
| 2011/0138959 A1* | 6/2011 | Wild | ........................ | F16H 61/32 |
| | | | | 74/473.36 |

\* cited by examiner

*Primary Examiner* — William Kelleher
*Assistant Examiner* — Gregory Prather
(74) *Attorney, Agent, or Firm* — Brooks Kushman P.C.

(57) ABSTRACT

A transfer case having a shift mechanism. The shift mechanism may include a shift rail, a range shift assembly, a mode shift assembly, and a sector cam. The sector cam may control movement of the range shift assembly and the mode shift assembly when the sector cam is rotated.

19 Claims, 7 Drawing Sheets

US 9,797,509 B2

TRANSFER CASE HAVING A SHIFT MECHANISM

TECHNICAL FIELD

This application relates to a transfer case having a shift mechanism.

BACKGROUND

A gear change apparatus for a vehicle transmission is disclosed in U.S. Pat. No. 4,785,681.

SUMMARY

In at least one embodiment, a transfer case is provided. The transfer case may have a shift mechanism. The shift mechanism may include a shift rail, a range shift assembly, a mode shift assembly, and a sector cam. The shift rail may move axially along a shift rail axis. The range shift assembly may be fixedly disposed on the shift rail. The mode shift assembly may move axially with respect to the shift rail. The sector cam may control movement of the range shift assembly and the mode shift assembly when the sector cam rotates about an axis.

In at least one embodiment, a transfer case is provided. The transfer case may include a housing and a shift mechanism that may be disposed in the housing. The shift mechanism may include a shift rail, a range shift assembly, a mode shift assembly, and a sector cam. The shift rail may move along a shift rail axis. The range shift assembly may be fixedly disposed on the shift rail and may be configured to select a drive gear ratio. The mode shift assembly may be moveably disposed on the shift rail and configured to select a wheel drive mode. The sector cam may be configured to rotate about an axis. The sector cam may include a cam window that may receive the range shift assembly and may have a first cam surface that may engage the range shift assembly and a second cam surface that may engage the mode shift assembly. The sector cam may actuate the mode shift assembly and/or the range shift assembly when the sector cam rotates about the axis.

In at least one embodiment, a transfer case is provided. The transfer case may have a shift mechanism that may include a shift rail, a range shift fork, a mode shift fork, and a sector cam. The shift rail may extend along a shift rail axis. The range shift fork may have a first roller and may be fixedly disposed with respect to the shift rail. The mode shift fork may have a second roller and may be configured to move axially with respect to the shift rail. The sector cam may be configured to rotate about an axis to actuate the range shift fork and the mode shift fork. The sector cam may include a first cam surface that may engage the first roller and a second cam surface that may engage the second roller.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
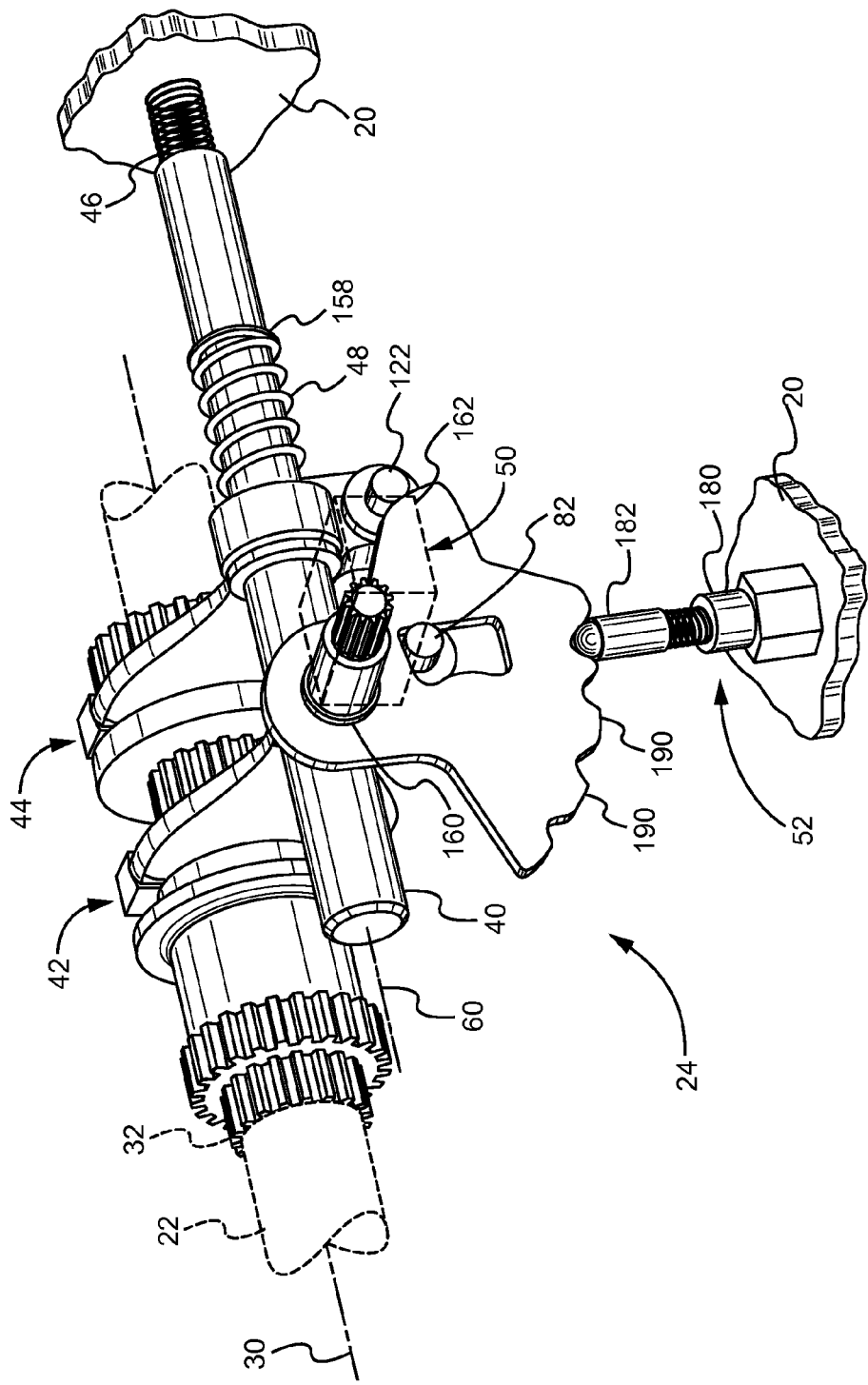
FIG. 1 is a perspective view of a portion of a transfer case having a shift mechanism.

Referring to FIG. 1, a portion of an exemplary transfer case 10 is shown. The transfer case 10 may be provided with a motor vehicle, such as a motor vehicle like a truck, bus, farm equipment, military transport or weaponry vehicle, or cargo loading equipment for land, air, or marine vessels.

The transfer case 10 may control the distribution of torque to one or more vehicle traction wheels. In addition, the transfer case 10 may be part of a drivetrain that may include at least one power source and a transmission.

The power source may provide power that may be used to rotate one or more traction wheels. In at least one embodiment, the power source may be configured as an internal combustion engine that may be adapted to combust any suitable type of fuel, such as gasoline, diesel fuel, or hydrogen. Alternatively, multiple power sources could be provided, such as may be employed with a hybrid vehicle. In such an embodiment, a power source could be an electric power source, such as a battery, capacitor, or fuel cell, or a non-electric power source, such as a hydraulic power source.

The power source(s) may be operatively coupled to an input of a transmission. An output of the transmission may be operatively coupled to an input of the transfer case 10, such as with a drive shaft. One or more outputs of the transfer case 10 may be coupled to one or more sets of vehicle traction wheels. As such, the transfer case 10 may provide torque to a single set of vehicle traction wheels or multiple sets of vehicle traction wheels to provide a multi-wheel or all-wheel drive (AWD) operation mode. For convenience in reference, the term "two wheel drive" is used to refer to operating modes in which the transfer case 10 may provide torque to a single set of vehicle traction wheels, such as may be associated with a single axle assembly and "four wheel drive" is used to refer to operating modes in which the transfer case 10 may provide torque to multiple sets of vehicle traction wheels, such as may be associated with multiple axle assemblies. In addition, the transfer case 10 may have multiple drive gear ratios that may modify the torque provided to one or more vehicle traction wheels.

Figure 2:
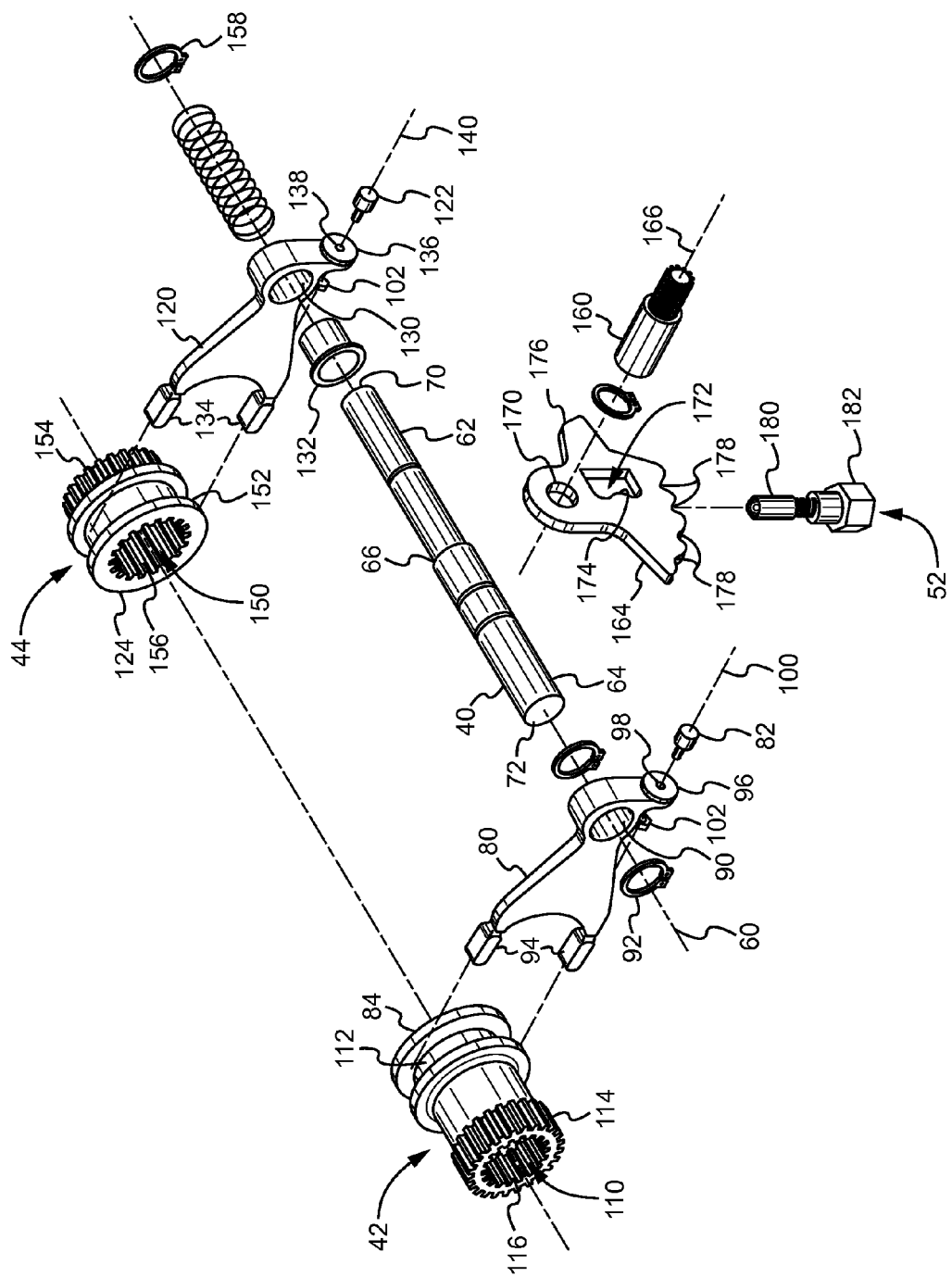
FIG. 2 is an exploded view of components of the shift mechanism.
Figure 3:
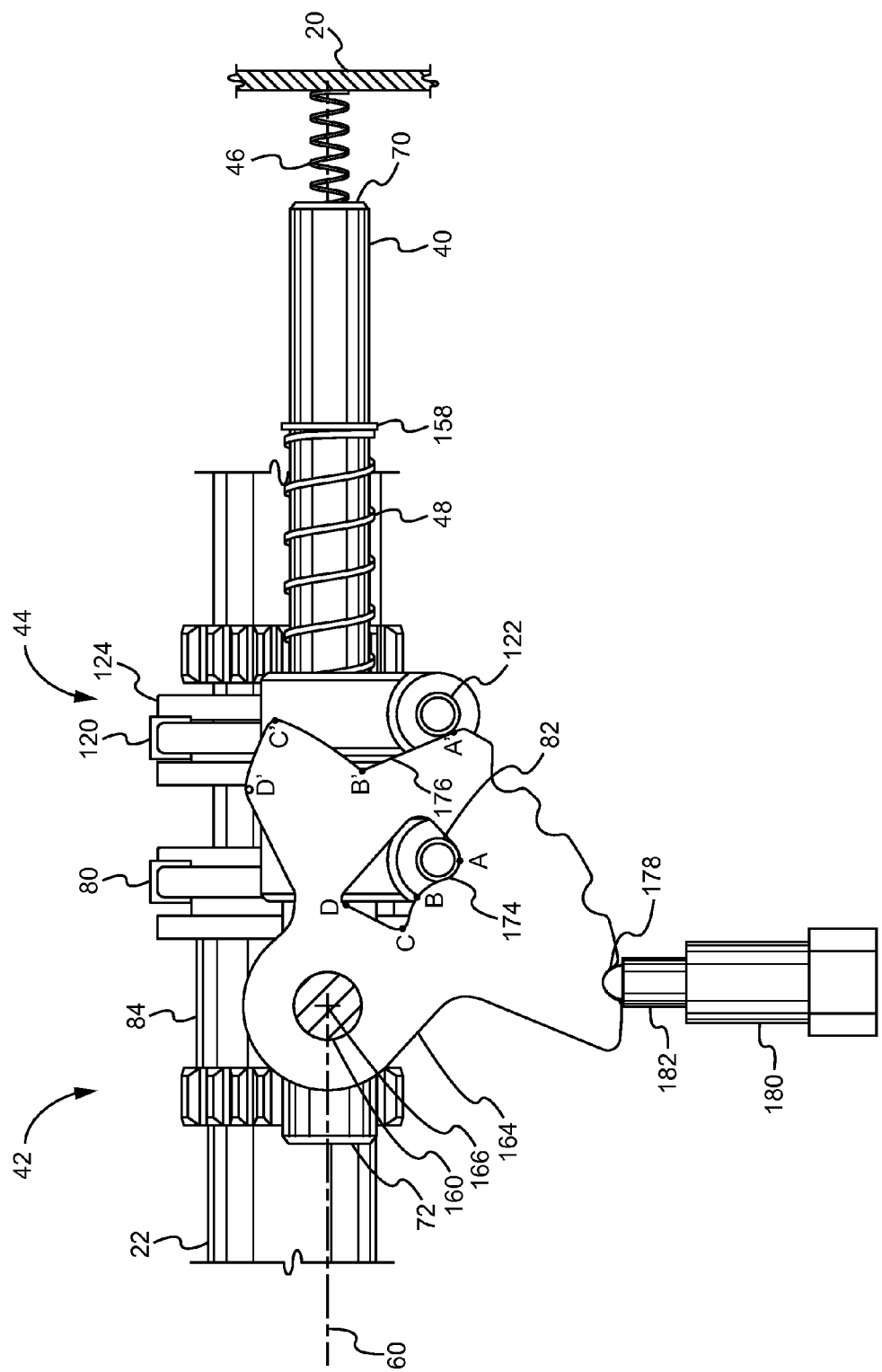
FIG. 3 is a side view illustrating the shift mechanism in a first position.

Referring to FIGS. 1-3, various components of the transfer case 10 are shown in more detail. The transfer case 10 may include a housing 20, an input shaft 22, and a shift mechanism 24.

The housing 20 may be provided to receive various components of the transfer case 10. In addition, the housing 20 may facilitate mounting of the transfer case 10 to the vehicle.

The input shaft 22 may be rotatably disposed in the housing 20. The input shaft 22 may extend along an axis of rotation 30 and may have at least one spline 32. The spline 32 may be disposed along a portion of the exterior surface or outside diameter of the input shaft 22. The teeth of the spline 32 may extend generally parallel to the axis of rotation 30 to facilitate sliding movement of at least one shift collar along the input shaft 22 as will be described in more detail below.

The input shaft 22 may receive torque from a range input shaft (not shown) that may be provided with the transfer case 10. For example, the input shaft 22 may be coaxially disposed with a range input shaft that may receive torque from a drivetrain component that may be coupled to the transfer case 10, such as a driveshaft. The input shaft 22 may be selectively coupled to the range input shaft. For instance, a clutch collar may be actuated to a neutral position to connect the range input shaft to the input shaft 22 or one or more engaged positions in which torque may be transmitted from the range input shaft to the input shaft 22, such as a low range gear ratio and a high range gear ratio as is discussed in more detail below. In at least one embodiment, a planetary gear set may be provided to connect the range input shaft to the input shaft 22. In such a configuration, a clutch collar may engage the planet gear carrier and disengage from the sun gear in the low speed range position and may engage the sun gear and disengage from the planet gear carrier in the high speed range position.

The shift mechanism 24 may control engagement of a drive gear ratio and/or a wheel drive mode. In at least one embodiment, the shift mechanism 24 may include a shift rail 40, a range shift assembly 42, a mode shift assembly 44, a first biasing member 46, a second biasing member 48, an actuator assembly 50, and a detent assembly 52.

The shift rail 40 may be movably disposed in the housing 20. For example, the shift rail 40 may extend along a shift rail axis 60 and may move axially along the shift rail axis 60. In at least one embodiment, the shift rail 40 may include a first portion 62, a second portion 64, and a step surface 66. The first portion 62 may extend from a first end 70 of the shift rail 40 to the step surface 66. The second portion 64 may extend from a second end 72 of the shift rail 40 that may be disposed opposite the first end 70 to the step surface 66. The step surface 66 may extend from the first portion 62 to the second portion 64. The first portion 62 may have a different diameter than the second portion 64 in one or more embodiments. For instance, the first portion 62 has a smaller diameter than the second portion 64 in the embodiment shown. Alternatively, the first and second portions 62, 64 may have the same diameters in one or more embodiments.

The range shift assembly 42 may be configured to select a drive gear ratio of the transfer case 10. More specifically, the range shift assembly 42 may engage a low range gear ratio or a high range gear ratio to provide a desired output gear ratio or output torque from the transfer case 10 to a traction wheel assembly. In addition, the range shift assembly 42 may move to a neutral position in which the low or high range gear ratios are not engaged and output torque is not delivered from the transfer case 10 to a traction wheel assembly. In at least one embodiment, the range shift assembly 42 may include a range shift fork 80, a first roller 82, and a range shift collar 84.

The range shift fork 80 may be fixedly disposed on the shift rail 40. In at least one embodiment, the range shift fork 80 may include a hole 90 through which the shift rail 40 may extend. The range shift fork 80 may be fixedly disposed on the shift rail 40 in any suitable manner, such as with an interference fit, fastener, welding, adhesive, or other bonding technique. In the embodiment shown, a pair of fasteners 92, such as snap rings, are provided that may be disposed on opposite sides of the range shift fork 80 and that may be fixedly disposed on the second portion 64 of the shift rail 40. As such, the fasteners 92 may cooperate to inhibit axial movement of the range shift fork 80 with respect to the shift rail 40.

The range shift fork 80 may also include a fork portion 94 and a roller mounting portion 96. The fork portion 94 may extend away from the shift rail 40 and the hole 90 and may be configured to engage the range shift collar 84. The roller mounting portion 96 may be configured to facilitate mounting of the first roller 82. The roller mounting portion 96 may be disposed on an opposite side of the range shift fork 80 from the fork portion 94. In at least one embodiment, the roller mounting portion 96 may include a mounting hole 98 through which the first roller 82 may extend.

The first roller 82 may be disposed proximate the roller mounting portion 96 and may extend along a first roller axis 100. In addition, at least a portion of the first roller 82 may be configured to rotate about the first roller axis 100. The first roller 82 may be secured to the range shift fork 80 in any suitable manner. In the embodiment shown, the first roller 82 includes a shaft that extends through the mounting hole 98. A fastener 102, such as a nut or clip, may be provided to inhibit removal of the shaft from the mounting hole 98.

The range shift collar 84 may be movably disposed on the input shaft 22. The range shift collar 84 may include a collar hole 110, an annular groove 112, and a gear portion 114.

The collar hole 110 may be configured as a through hole through which the input shaft 22 may extend. A spline 116 may be provided on an interior surface that defines at least a portion of the collar hole 110. The teeth of the spline 116 may extend substantially parallel to the axis of rotation 30 and may be configured to engage and mate with the teeth of the spline 32 on the input shaft 22. As such, the range shift collar 84 may rotate with the input shaft 22 but may move axially along the input shaft 22.

The annular groove 112 may extend continuously around the range shift collar 84. The annular groove 112 may receive the fork portion 94.

The gear portion 114 may include a set of teeth that may be configured to engage corresponding teeth on a driven gear of the transfer case 10. In FIGS. 1 and 2, the teeth of the gear portion 114 are generally arranged around a circumference of the range shift collar 84. Alternatively, the gear portion 114 may be configured as a face gear in which teeth may be disposed along an end surface of the range shift collar 84.

The mode shift assembly 44 may be movably disposed on the shift rail 40 and may be configured to select a wheel drive mode. More specifically, the mode shift assembly 44 may direct torque to one or more sets of vehicle traction wheels, or selectively engage a two wheel drive or four wheel drive operating mode. In at least one embodiment, the mode shift assembly 44 may include a mode shift fork 120, a second roller 122, and a mode shift collar 124.

The mode shift fork 120 may have the same configuration or a similar configuration as the range shift fork 80. The mode shift fork 120 may be spaced apart from and may move independently of the range shift fork 80. The mode shift fork 120 may be moveably disposed on the shift rail 40. In at least one embodiment, the mode shift fork 120 may include a hole 130 through which the shift rail 40 may extend. The mode shift fork 120 may be moveably disposed on the shift rail 40 in any suitable manner. For instance, a bushing 132 may be disposed between the shift rail 40 and the mode shift fork 120 to facilitate axial movement of the mode shift fork 120 along the shift rail 40. The step surface 66 may help limit axial movement of the mode shift fork 120. For example, the mode shift fork 120 and/or the bushing 132 may engage the step surface 66 to inhibit movement of the mode shift fork 120 toward the range shift fork 80.

The mode shift fork 120 may also include a fork portion 134 and a roller mounting portion 136. The fork portion 134 may extend away from the shift rail 40 and the hole 130 and may be configured to engage the mode shift collar 124. The roller mounting portion 136 may be configured to facilitate mounting of the second roller 122. The roller mounting portion 136 may be disposed on an opposite side of the mode shift fork 120 from the fork portion 134. In at least one embodiment, the roller mounting portion 136 may include a mounting hole 138 through which the second roller 122 may extend.

The second roller 122 may be disposed proximate the roller mounting portion 136 and may extend along a second roller axis 140. In addition, at least a portion of the second roller 122 may be configured to rotate about the second roller axis 140.

The second roller 122 may or may not be fixedly disposed with respect to the mode shift fork 120. In FIGS. 1-6, the second roller 122 is fixedly disposed on the mode shift fork 120 such that the second roller axis 140 does not move with respect to the mode shift fork 120. The second roller 122 may be secured to the mode shift fork 120 in any suitable manner. For example, the second roller 122 may include a shaft that may extend through the mounting hole 138 and may be secured with a fastener 102 as previously discussed.

Figure 7:
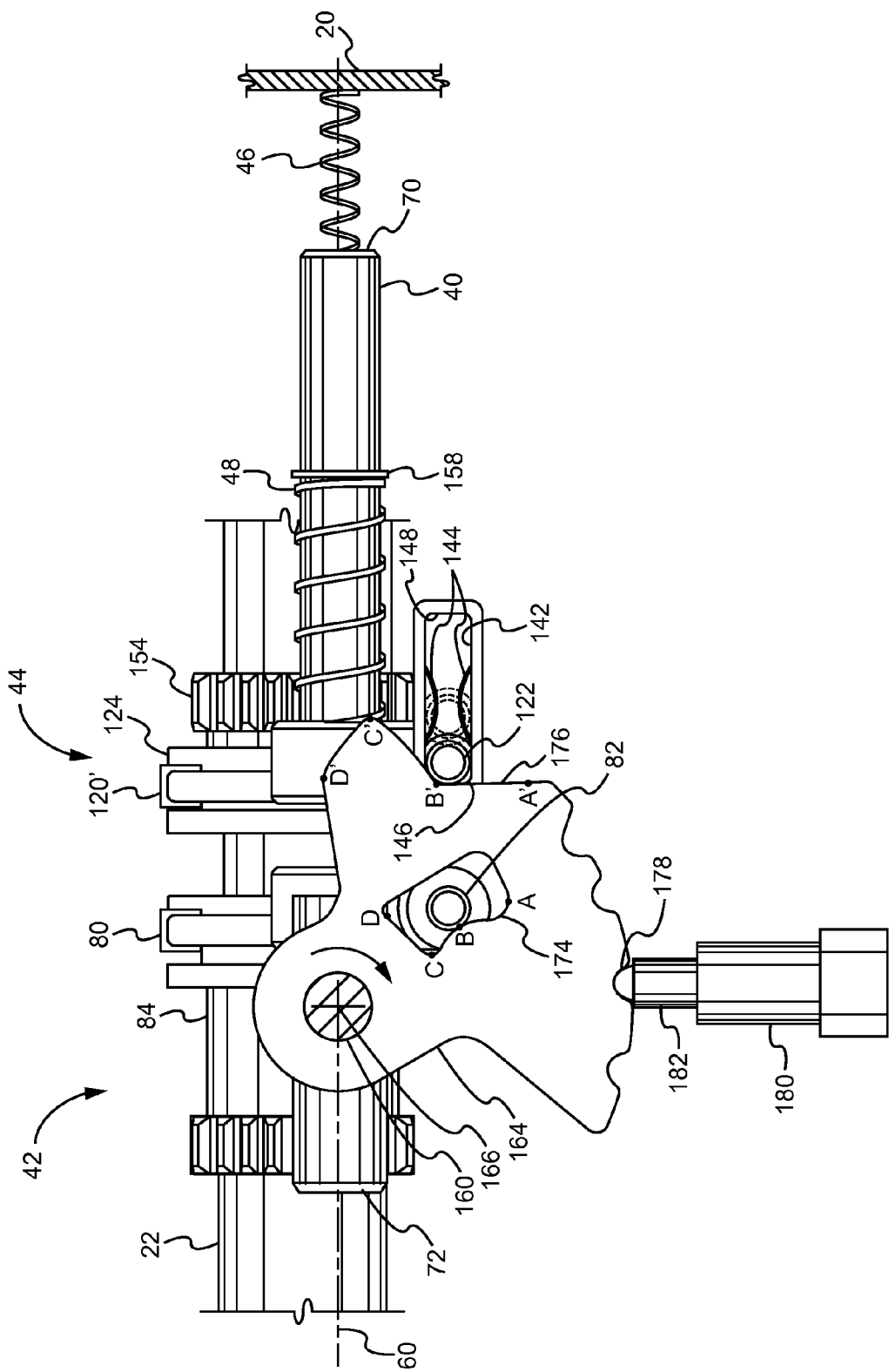
FIG. 7 is a side view of another embodiment of a shift mechanism.

In FIG. 7, the second roller 122 is moveably disposed on the mode shift fork 120'. For example, the mode shift fork 120' may include a slot 142 and a roller biasing member 144. The slot 142 may receive the second roller 122 and may have a linear configuration in one or more embodiments. The second roller 122 may be configured to slide between a first end 146 and a second end 148 of the slot 142. A roller biasing member 144 may exert a biasing force on the second roller 122 that may bias the second roller 122 toward the actuator assembly 50 and first end 146 of the slot 142 or to the left from the perspective shown. The roller biasing member 144 may have any suitable configuration. For example, the roller biasing member 144 may be configured as one or more springs. The second roller 122 may overcome the biasing force exerted by the roller biasing member 144 and move toward the second end 148 of the slot 142 when a blocked shift condition is present as will be discussed in more detail below.

Referring again to FIGS. 1-6, the mode shift collar 124 may be movably disposed on the input shaft 22. The mode shift collar 124 may have a similar configuration as the range shift collar 84 and may include a collar hole 150, an annular groove 152, and a gear portion 154.

The collar hole 150 may be configured as a through hole through which the input shaft 22 may extend. A spline 156 may be provided on an interior surface that defines at least a portion of the collar hole 150. The teeth of the spline 156 may extend substantially parallel to the axis of rotation 30 and may be configured to engage and mate with the teeth of the spline 32 on the input shaft 22. As such, the mode shift collar 124 may rotate with the input shaft 22 but may move axially along the input shaft 22.

The annular groove 152 may extend continuously around the mode shift collar 124. The annular groove 152 may receive the fork portion 134.

The gear portion 154 may include a set of teeth that may be spaced apart from the input shaft 22 and may be configured to engage corresponding teeth on a differential unit of the transfer case 10 and provide differential lock functionality. In FIGS. 1 and 2, the teeth of the gear portion 154 are generally arranged around a circumference of the mode shift collar 124. Alternatively, the gear portion 154 may be configured as a face gear in which teeth may be disposed along an end surface of the mode shift collar 124.

The first biasing member 46 may be configured to exert a biasing force on the shift rail 40. For example, the first biasing member 46 may bias the first end 70 of the shift rail 40 away from the housing 20, or to the left from the perspective shown in FIG. 3. The first biasing member 46 may have any suitable configuration and may be disposed between the housing 20 and the first end 70 of the shift rail 40 in one or more embodiments. The first biasing member 46 may have a greater spring constant then the second biasing member 48. As such, less force may be applied to actuate the mode shift assembly 44 than the range shift assembly 42.

The second biasing member 48 may be spaced apart from the first biasing member 46. The second biasing member 48 may bias the mode shift assembly 44 toward the range shift assembly 42, or to the left from the perspective shown in FIG. 3. The second biasing member 48 may have any suitable configuration. For example, the second biasing member 48 may be configured as a coil spring that may disposed around the shift rail 40. In addition, the second biasing member 48 may be disposed between the housing 20 and the mode shift assembly 44. For instance, the second biasing member 48 may extend from the mode shift fork 120 to a mounting feature 158, such as a snap ring, that may be fixedly disposed on the first portion 62 of the shift rail 40 between the first end 70 and the step surface 66.

The actuator assembly 50 may be configured to actuate the range shift assembly 42 and/or the mode shift assembly 44. As is best shown in FIGS. 1 and 2, the actuator assembly 50 may include an actuator shaft 160, an actuator 162, and a sector cam 164.

The actuator shaft 160 may interconnect the actuator 162 and the sector cam 164. The actuator shaft 160 may extend along and may be configured to rotate about an axis 166. The actuator shaft 160 may be rotatably disposed in the housing 20. For example, the actuator shaft 160 may be rotatably supported by a bearing that may be disposed proximate the housing 20. The actuator shaft 160 may also include a first end and a second end disposed opposite the first end.

The actuator 162 may be configured to rotate the actuator shaft 160 about the axis 166. The actuator 162 may be of any suitable type, such as a pneumatic, hydraulic, mechanical, electrical, or electromechanical actuator. The actuator 162 may or may not have braking capability that may be employed to inhibit rotation of the actuator shaft 160 or hold the actuator shaft 160 in a desired position. In at least one embodiment, the actuator 162 may be coupled to the first end of the actuator shaft 160. Operation of the actuator 162, and hence rotation of the actuator shaft 160 and sector cam 164, may be based on an input or input signal from a vehicle operator and/or from a control module or control system. As an example, an input signal may be received from an input device, such as a shift lever or button, and may allow a vehicle operator to select a wheel drive mode and/or shift between the low range and high range gear ratios and a neutral position.

The sector cam 164 may be fixedly disposed on the actuator shaft 160. As such, the sector cam 164 may rotate about the axis 166 with the actuator shaft 160. The sector cam 164 may be coupled to the actuator shaft 160 in any suitable manner. For example, the sector cam 164 may include a hole 170 that may receive the actuator shaft 160. The actuator shaft 160 may be press fit into the hole or secured to the sector cam 164 in any suitable manner, such as with one or more fasteners like a snap ring, weld, adhesive, or other bonding technique. In FIG. 1, the sector cam 164 is disposed proximate the second end of the actuator shaft 160. The sector cam 164 may resemble a sector of a circle and may have an arcuate exterior surface. The sector cam 164 may include a cam window 172, a first cam surface 174, a second cam surface 176, and a set of notches 178.

The cam window 172 may be disposed within the sector cam 164. For example, the cam window 172 may be configured as a through hole that may be completely defined within the sector cam 164 and that may extend from a first surface that may face toward the shift rail 40 to a second surface disposed opposite the first surface. The cam window 172 may receive a portion of the range shift assembly 42, such as the first roller 82. The cam window 172 may be generally disposed near the middle of the sector cam 164 and may be generally disposed between the hole 170 and the set of notches 178 in one or more embodiments.

The first cam surface 174 may at least partially define the cam window 172. In addition, the first cam surface 174 may guide movement of the range shift assembly 42 when the sector cam 164 is rotated. More specifically, the first cam surface 174 may engage the first roller 82 and guide movement between points A, B, C and D when the sector cam 164 is rotated as is best shown in FIGS. 3-6 and as will be discussed in more detail below. The first cam surface 174 may be convex from point A to point C and may be generally concave from point B to point D in one or more embodiments.

The second cam surface 176 may be spaced apart the first cam surface 174 and may have a different configuration than the first cam surface 174. The second cam surface 176 may guide movement of the mode shift assembly 44 when the sector cam 164 is rotated. More specifically, the second cam surface 176 may engage the second roller 122 and guide movement between points A', B', C', and D' when the sector cam 164 is rotated as will be discussed in more detail below. The second cam surface 176 may be concave from point A' to point C' and may be generally convex from point B' to point D' in one or more embodiments.

The set of notches 178 may be arranged along an exterior surface of the sector cam 164, such as along an arcuate exterior surface. The members of the set of notches 178 may be spaced apart from each other and may be configured as indentations that may be generally concave. As is best shown in FIG. 2, four notches 178 may be provided. Each member of the set of notches 178 may correspond with a different operation mode of the transfer case 10 as will be discussed in more detail below.

The detent assembly 52 may help control movement of the sector cam 164. In at least one embodiment, the detent assembly 52 may include a detent actuator 180 and a detent feature 182.

The detent actuator 180 may be configured to move the detent feature 182 between a retracted position and an extended position. In the retracted position, the detent feature 182 may be spaced apart from the sector cam 164. In the extended position, the detent feature 182 may engage the sector cam 164 and may be received in a member of the set of notches 178 depending on the rotational position of the sector cam 164. The detent actuator 180 may exert sufficient force to inhibit rotation of the sector cam 164 when the detent feature 182 is received in a notch 178. The detent actuator 180 may be of any suitable type, such as a pneumatic, hydraulic, mechanical, electrical, or electromechanical actuator. In at least one embodiment, the detent actuator 180 may be configured as a solenoid in which the detent feature 182 is actuated toward the retracted position when power is not provided to the solenoid and actuated toward the extended position when power is provided to energize the solenoid coils. Alternatively, it is contemplated that the detent actuator 180 may be actuated toward the retracted position when power is provided in one or more embodiments. The sector cam 164 may be free to rotate counterclockwise when the detent feature 182 is in the retracted position in response to actuation of the shift rail 40 under the biasing force exerted by the first biasing member 46. The detent actuator 180 may also be configured as a spring or linear actuator in various embodiments. The detent actuator 180 may be coupled to the housing 20 in one or more embodiments.

The detent feature 182 may be coupled to the detent actuator 180. The detent feature 182 may be configured to be received in a notch 178 to inhibit rotation of the sector cam 164 and may slide along an arcuate exterior surface 190 of the sector cam 164 between the notches 178 when the sector cam 164 is rotated and a notch 178 is not aligned with the detent feature 182.

Referring to FIGS. 3-6, operation modes of the transfer case 10 will now be discussed in more detail.

In FIG. 3, the shift mechanism 24 is shown in a first position. In the first position, the detent feature 182 may be received in a first notch 178, the range shift assembly 42 may be positioned such that a low range gear ratio is engaged, and the mode shift assembly 44 may be positioned such that a four wheel drive operating mode is selected in which torque is directed to multiple sets of vehicle traction wheels. The first roller 82 is disposed at point A. The second roller 122 is disposed at point A'.

Figure 4:
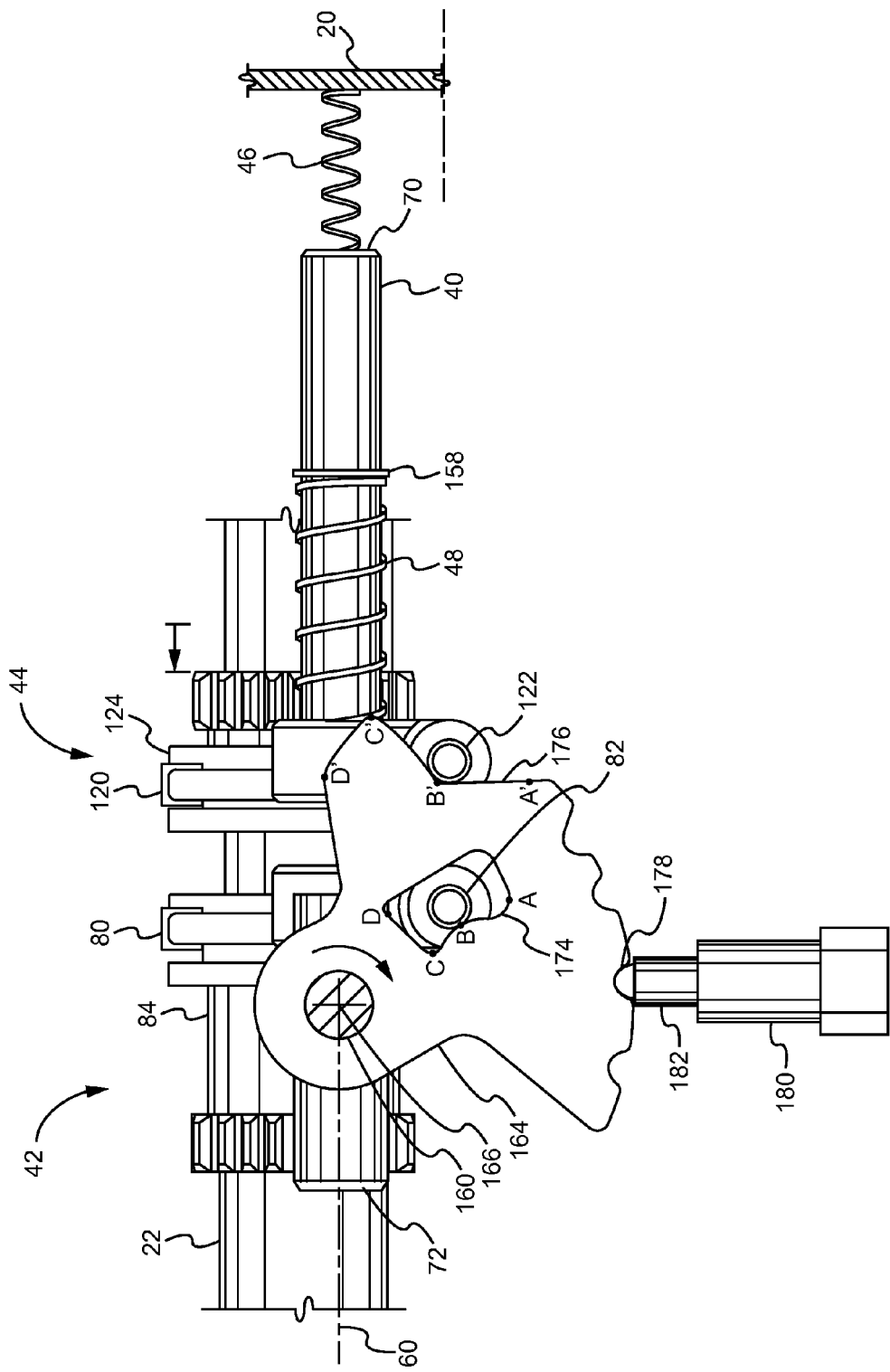
FIG. 4 is a side view illustrating the shift mechanism in a second position.

In FIG. 4, the shift mechanism 24 is shown in a second position. In the second position, the range shift assembly 42 may be positioned in a neutral position in which the low and high range gear ratios are not engaged and the mode shift assembly 44 may be positioned such that a two wheel drive mode is selected. As compared with FIG. 3, the sector cam 164 is rotated clockwise about the axis 166. The first roller 82 moves along the first cam surface 174 from point A to point B, thereby allowing the range shift assembly 42 and shift rail 40 to move to the left from the perspective shown under the biasing force of the first biasing member 46. The second roller 122 moves along the second cam surface 176 from point A' to point B', thereby allowing the mode shift assembly 44 to move to the left from the position shown in FIG. 3 under the biasing force of the second biasing member 48. The detent feature 182 is received in a second notch 178.

Figure 5:
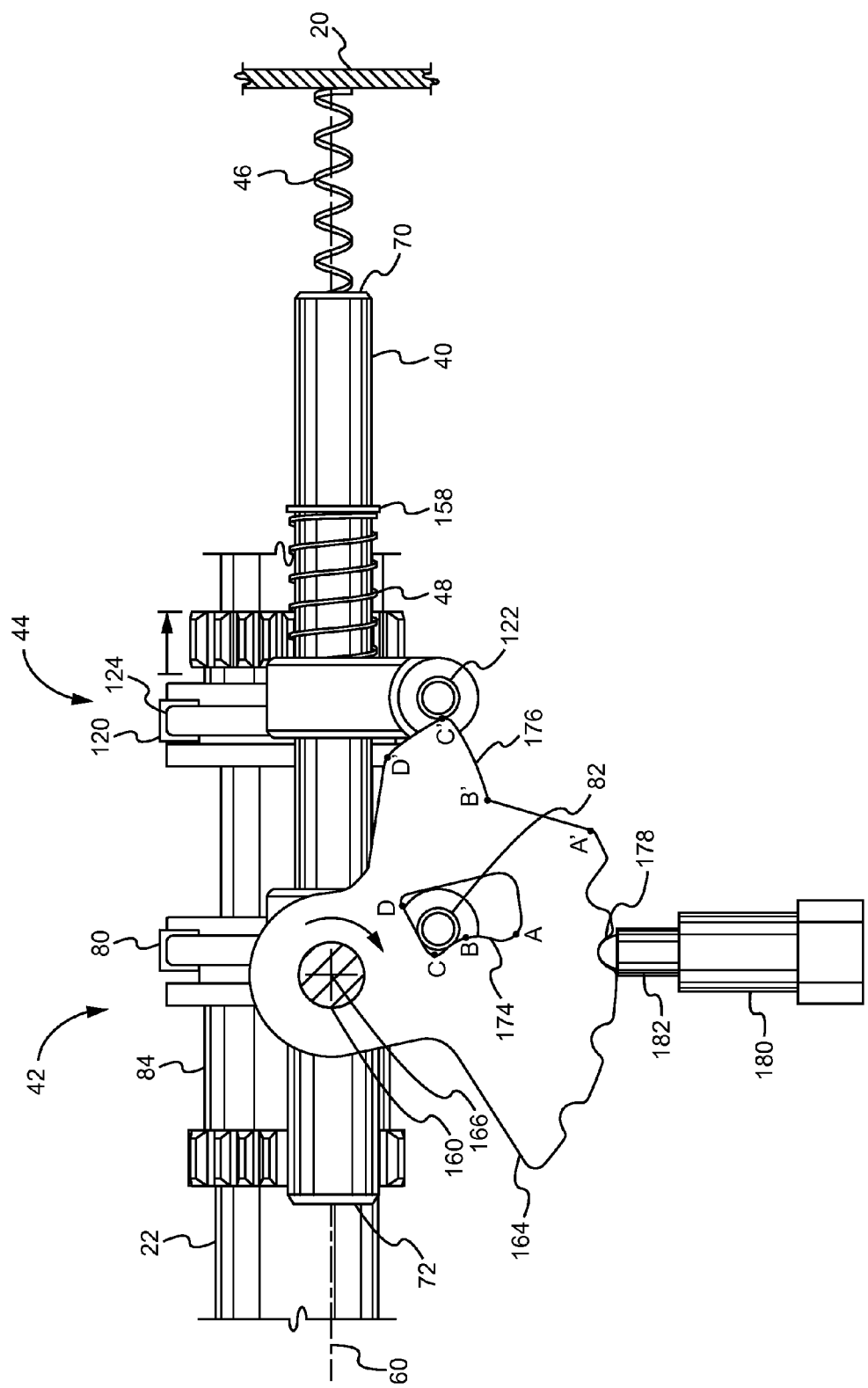
FIG. 5 is a side view illustrating the shift mechanism in a third position.

In FIG. 5, the shift mechanism 24 is shown in a third position. In the third position, the range shift assembly 42 may be positioned such that a high range gear ratio is engaged and the mode shift assembly 44 may be positioned such that a four wheel drive mode is selected. In the high range gear ratio, the range shift collar 84 may be disengaged from a planet gear carrier of the planetary gear set and may engage the sun gear of the planetary gear set or otherwise be positioned such that torque may be transmitted from the range input shaft to the input shaft via the sun gear. As compared with FIG. 4, the sector cam 164 is rotated clockwise about the axis 166. The first roller 82 moves along the first cam surface 174 from point B to point C, thereby allowing the range shift assembly 42 and shift rail 40 to move to the left from the perspective shown under the biasing force of the first biasing member 46. The second roller 122 moves along the second cam surface 176 from point B' to point C', thereby allowing the mode shift assembly 44 to move to the right from the position shown in FIG. 4 as force exerted by the sector cam 164 against the mode shift assembly 44 overcomes the biasing force of the second biasing member 48. As such, the mode shift assembly 44 and mode shift collar 124 may be in the same position in FIGS. 3 and 5. The detent feature 182 is received in a second notch 178.

Figure 6:
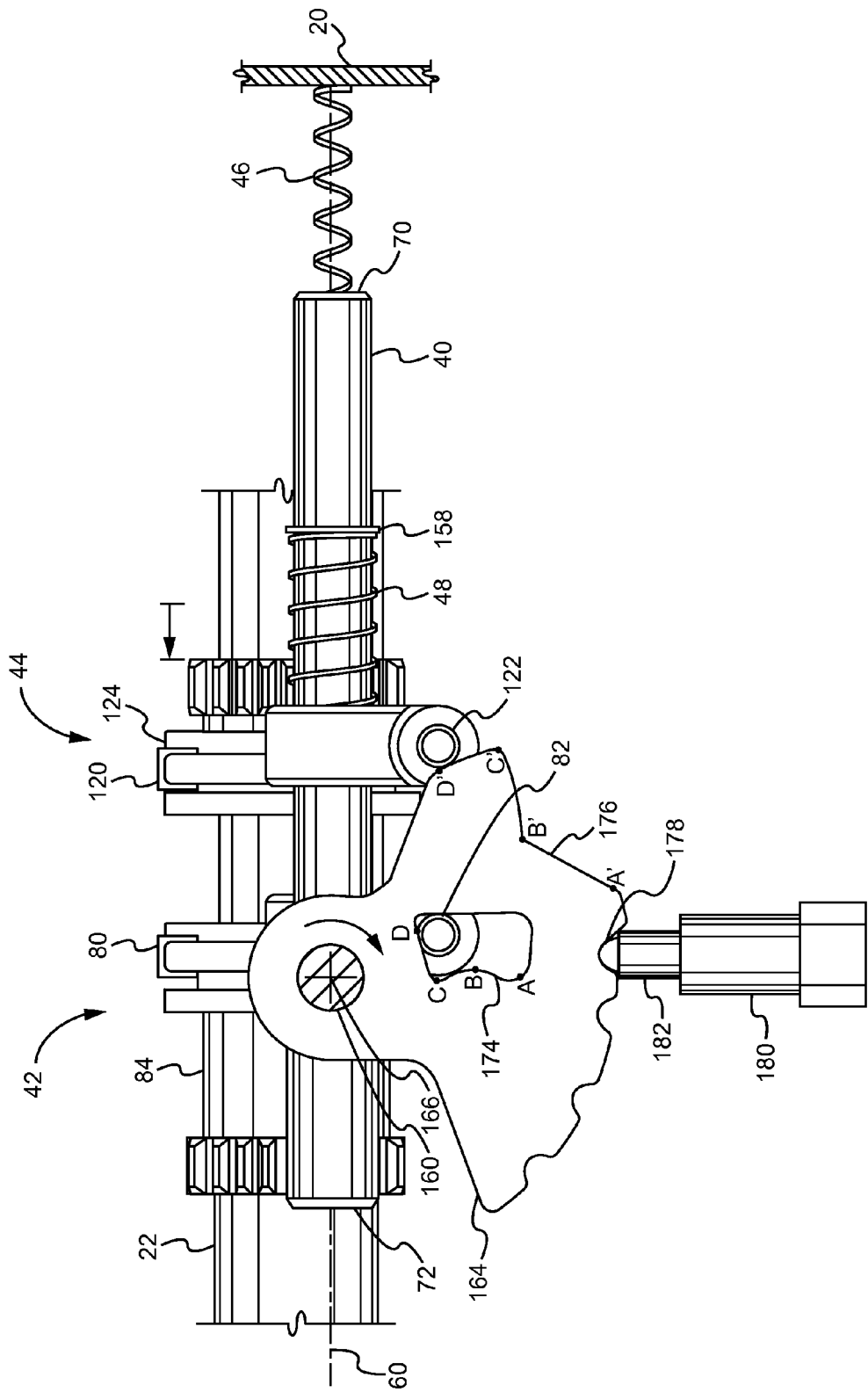
FIG. 6 is a side view illustrating the shift mechanism in a fourth position.

In FIG. 6, the shift mechanism 24 is shown in a fourth position. In the fourth position, the range shift assembly 42 may be positioned such that a high range gear ratio is engaged and the mode shift assembly 44 may be positioned such that a two wheel drive mode is selected. As compared with FIG. 5, the sector cam 164 is rotated clockwise about the axis 166. The first roller 82 moves along the first cam surface 174 from point C to point D, thereby allowing the range shift assembly 42 and shift rail 40 to remain stationary under the biasing force of the first biasing member 46 as compared to FIG. 4. The second roller 122 moves along the second cam surface 176 from point C' to point D', thereby allowing the mode shift assembly 44 to move to the left from the position shown in FIG. 5 under the biasing force of the second biasing member 48. As such, the mode shift assembly 44 and mode shift collar 124 may be in the same position in FIGS. 4 and 6. The detent feature 182 is received in a second notch 178.

Referring to FIG. 7, actuation of the second roller 122 during a blocked shift condition will now be discussed in more detail. A blocked shift condition may exist when the teeth of the gear portion 154 of the mode shift collar 124 are inhibited from meshing and mating with corresponding teeth on a gear of the differential unit of the transfer case 10. As such, the mode shift collar 124 and mode shift fork 120 may be inhibited from moving to the right from the perspective shown due to tooth misalignment. In such a situation, the slot 142 and roller biasing member 144 may allow the second roller 122 to move within the slot 142 to permit the sector cam 164 to continue to rotate about the axis 166, which may help inhibit damage to the actuator assembly 50. More specifically, the force exerted by the sector cam 164 as it rotates in a clockwise direction may overcome the biasing force exerted by the roller biasing member 144 and allow the second roller 122 to move from the first end 146 toward the second end 148 of the slot 142. As such, the sector cam 164 will be rotated clockwise from the position shown in FIG. 7 and the second roller 122 may be located closer to point C'. The biasing force exerted by the roller biasing member 144 may then actuate the second roller 122 back toward the first end 146 of the slot 142 and allow the mode shift fork 120 and mode shift collar 124 to move to the right relative to the second roller 122 from the perspective shown when the blocked shift condition is alleviated. The roller biasing member 144 may be configured to permit movement of the second roller 122 along the slot 142 only when a blocked shift condition exists or the mode shift fork 120 is inhibited from moving axially along the shift rail 40.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A transfer case comprising:
   a shift mechanism that includes:
      a shift rail that moves axially along a shift rail axis;
      a range shift assembly fixedly disposed on the shift rail and that moves a range shift collar to select and engage one of a low range gear ratio, a high range gear ratio, and a neutral position;
      a mode shift assembly that moves axially with respect to the shift rail and that moves a mode shift collar to select and engage one of a two wheel drive mode and a four wheel drive mode;
      a biasing member that extends from a mode shift fork of the mode shift assembly to a mounting feature that is fixedly disposed on the shift rail between the mode shift fork and a first end of the shift rail; and
      a sector cam that rotates about an axis, wherein the sector cam controls movement of the range shift assembly and the mode shift assembly when the sector cam rotates about the axis.

2. The transfer case of claim 1 further comprising a detent assembly, wherein the sector cam further comprises a set of notches and the detent assembly engages a member of the set of notches to inhibit rotation of the sector cam and movement of the range shift assembly and the mode shift assembly.

3. The transfer case of claim 2 wherein the detent assembly is moveable with respect to the sector cam when power is not provided to the detent assembly.

4. The transfer case of claim 1 wherein the range shift assembly engages the low range gear ratio and the mode shift assembly engages the four wheel drive mode when the sector cam is in a first position.

5. The transfer case of claim 1 wherein the range shift assembly is in the neutral position when the sector cam is in a second position.

6. The transfer case of claim 1 wherein the range shift assembly engages the high range gear ratio and the mode shift assembly engages the four wheel drive mode when the sector cam is in a third position.

7. The transfer case of claim 1 wherein the range shift assembly engages the high range gear ratio and the mode shift assembly engages the two wheel drive mode when the sector cam is in a fourth position.

8. The transfer case of claim 1 wherein the mode shift fork has a second roller that extends along a second roller axis that is fixedly positioned with respect to the mode shift fork.

9. A transfer case comprising:
   a housing; and
   a shift mechanism that is disposed in the housing and includes:
      a shift rail that moves along a shift rail axis;
      a range shift assembly that is fixedly disposed on the shift rail and that selects and engages one of a low range gear ratio, a high range gear ratio, and a neutral position;
      a mode shift assembly that is moveably disposed on the shift rail and that selects and engages one of a two wheel drive mode and a four wheel drive mode; and
      a sector cam that is rotatable about an axis, wherein the sector cam includes a cam window that receives the range shift assembly and has a first cam surface that engages the range shift assembly and a second cam surface that directly engages the mode shift assembly, wherein the sector cam actuates the mode shift assembly and/or the range shift assembly when the sector cam rotates about the axis.

10. The transfer case of claim 9 further comprising a first biasing member that is disposed between the housing and a first end of the shift rail, wherein the first biasing member biases the first end of the shift rail away from the housing.

11. The transfer case of claim 10 further comprising a second biasing member that biases the mode shift assembly toward the range shift assembly.

12. The transfer case of claim 11 wherein the first biasing member has a greater spring constant than the second biasing member.

13. The transfer case of claim 11 wherein the second biasing member is disposed around the shift rail and is disposed between the mode shift assembly and the first end of the shift rail.

14. The transfer case of claim 11 wherein the second biasing member extends from a mode shift fork of the mode shift assembly to a mounting ring that is fixedly disposed on the shift rail between the mode shift fork and the first end of the shift rail.

15. A transfer case comprising:
a shift mechanism that includes:
a shift rail that extends along a shift rail axis;
a range shift fork that has a first roller and is fixedly disposed with respect to the shift rail, wherein the range shift fork moves a range shift collar to select and engage one of a low range gear ratio, a high range gear ratio, and a neutral position;
a mode shift fork that has a second roller and is moveable axially with respect to the shift rail, wherein the mode shift fork moves a mode shift collar to select and engage one of a two wheel drive mode and a four wheel drive mode; and
a sector cam that is rotatable about an axis to actuate the range shift fork and the mode shift fork, wherein the sector cam includes a first cam surface that engages the first roller and a second cam surface that engages the second roller, and the second roller extends along a second roller axis that is moveably disposed with respect to the mode shift fork.

16. The transfer case of claim 15 wherein the mode shift fork is spaced apart from and moves independently of the range shift fork.

17. The transfer case of claim 15 wherein the mode shift fork has a slot that receives the second roller, wherein the second roller is configured to slide between a first end and a second end of the slot.

18. The transfer case of claim 17 wherein the second roller is configured to slide away from the first end of the slot when the sector cam is rotated about the axis and the mode shift fork is inhibited from sliding along the shift rail.

19. The transfer case of claim 15 further comprising a roller biasing member that biases the second roller toward the sector cam.

* * * * *